United States Patent
Rohrbach et al.

(10) Patent No.: US 10,122,000 B2
(45) Date of Patent: Nov. 6, 2018

(54) TRANSPORT DEVICE FOR LITHIUM BATTERIES IN AN AIRCRAFT

(71) Applicant: AIRBUS OPERATIONS GMBH, Hamburg (DE)

(72) Inventors: Paul Rohrbach, Hamburg (DE); Nadine Gomm, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 49 days.

(21) Appl. No.: 15/331,449

(22) Filed: Oct. 21, 2016

(65) Prior Publication Data

US 2017/0271636 A1   Sep. 21, 2017

(30) Foreign Application Priority Data

Mar. 21, 2016   (DE) .................... 20 2016 001 797 U

(51) Int. Cl.

| | |
|---|---|
| *H01M 2/12* | (2006.01) |
| *H01M 2/10* | (2006.01) |
| *H01M 2/36* | (2006.01) |
| *B65D 25/04* | (2006.01) |
| *B65D 43/00* | (2006.01) |
| *H01M 10/052* | (2010.01) |
| *H01M 10/42* | (2006.01) |

(52) U.S. Cl.
CPC .......... *H01M 2/1258* (2013.01); *B65D 25/04* (2013.01); *B65D 43/00* (2013.01); *H01M 2/1077* (2013.01); *H01M 2/1094* (2013.01); *H01M 2/364* (2013.01); *H01M 2/368* (2013.01); *H01M 10/052* (2013.01); *H01M 10/4207* (2013.01); *H01M 10/4214* (2013.01); *H01M 2200/20* (2013.01); *Y02E 60/122* (2013.01)

(58) Field of Classification Search
CPC .. H01M 2/1258; H01M 2/1077; H01M 2/364; H01M 2/368; H01M 2/1094; H01M 10/052; H01M 10/4207; H01M 10/4214
See application file for complete search history.

(56) References Cited

U.S. PATENT DOCUMENTS

2013/0207617 A1* 8/2013 Houchin-Miller .... B60L 3/0076
320/150

* cited by examiner

*Primary Examiner* — Jane J Rhee
(74) *Attorney, Agent, or Firm* — Jenkins, Wilson, Taylor & Hunt, P.A.

(57) ABSTRACT

A transport device for lithium batteries in an aircraft, in particular in a hold, includes a container and a lid, lithium batteries being arranged in the container and the lid closing the container during transport of the lithium batteries. A shutoff valve neutralizes electrolyte released by the lithium batteries within the container or conveys the electrolyte to the outside.

11 Claims, 1 Drawing Sheet

TRANSPORT DEVICE FOR LITHIUM BATTERIES IN AN AIRCRAFT

CROSS-REFERENCE TO RELATED APPLICATION

This application claims priority to German Utility Model No. 20 2016 001 797.8 filed Mar. 21, 2016, the entire disclosure of which is incorporated by reference herein.

TECHNICAL FIELD

The disclosure herein relates to a transport device for lithium batteries in an aircraft.

BACKGROUND

In the present disclosure, the term "lithium batteries" is understood to mean primary cells, lithium metal batteries, lithium ion batteries and lithium polymer batteries, these all being rechargeable.

Lithium batteries have a wide range of uses, in particular in various electronic and microelectronic components. Some advantages of lithium batteries over other primary cells having aqueous electrolytes, such as alkaline batteries or zinc-carbon batteries, or conventional batteries, are higher energy density and a higher specific energy, the high cell voltage, the very long shelf life owing to low levels of self-discharge and the wide temperature range for storage and operation.

Lithium batteries are in demand worldwide, and therefore it needs to be ensured that lithium batteries can be rapidly provided to various places across the world.

One rapid and flexible means of transport for lithium batteries is by aircraft, in particular passenger aircraft.

When transporting lithium batteries by aircraft, the regulations for the transport of dangerous goods by the International Civil Aviation Organisation need to be observed. The provisions of the regulations set out what dangerous goods are permitted to be shipped by air transport, and if they are, what net quantity is not permitted to be exceeded per package. In addition, the dangerous goods must be packaged and transported in accordance with specific guidelines. When transporting lithium batteries, specific declarations, packaging and labelling must be taken into account.

The current regulations do not provide for any fire protection in terms of packaging. Lithium metal batteries have been prohibited from being transported on passenger aircraft since 2015. From 1 Apr. 2016 onwards, the transport of lithium ion batteries on passenger aircraft will also be prohibited due to a lack of protection factors. For the transport of lithium ion batteries, from 1 Apr. 2016 onwards there will also be additional guidelines for freight aircraft.

A possible solution is to use what are known as gel packs, which are laid onto the lithium batteries, meaning that if thermal runaway occurs, the lithium batteries are cooled down by a liquid in the gel pack so that a chain reaction does not occur with adjoining or adjacent cells.

SUMMARY

In order to ensure that lithium batteries are transported as safely as possible, the problem addressed by the present disclosure is to develop the previously known transport device for lithium batteries.

The concept underlying the present disclosure in particular involves conveying to the outside an electrolyte released by an external fire or thermal runaway and energy released thereby in the form of heat and pressure surges, neutralizing the electrolyte and energy or insulating the electrolyte and energy from the outside as far as possible, in particular thermally.

The transport device for lithium batteries in an aircraft that is described here comprises a container and a lid, wherein lithium batteries are arranged in the container. The lid closes the container during transport of the lithium batteries. The lid can in particular hermetically close the container. The container in particular comprises an interior or cavity in which a plurality of lithium batteries can be arranged and transported by the transport device. For example, the container contains one thousand eight hundred and sixty lithium batteries.

The transport device further comprises a shutoff valve, wherein the shutoff valve neutralizes electrolyte released by the lithium batteries within the container, or conveys the electrolyte to the outside. In this way, the shutoff valve can operate on the basis of an internal pressure in the container. The transport device that is described here may for example comprise a plurality of shutoff valves, in particular two shutoff valves, in order to increase reliability in terms of the functionality of the transport device.

According to some embodiments, the released electrolyte is neutralized by a catalyst arranged upstream of the shutoff valve. Using the catalyst that is described here, the released electrolyte in gaseous form can be chemically neutralized or decomposed such that it loses its highly flammable and/or poisonous property. Advantageously, a catalysed electrolyte does not pose a risk of fire or explosion to freight aircraft and passenger aircraft.

According to some embodiments, the released electrolyte is conveyed to the outside by a line connected to the shutoff valve. In this context, a shutoff valve is understood to mean a unidirectionally permeable valve which allows a medium (for example a released electrolyte) to pass out of the container towards the outside. The released electrolyte that is allowed to pass through the shutoff valve can be conducted to the outside of the aircraft by the line, and therefore the electrolyte is no longer in the hold and no longer poses a risk of fire or explosion.

According to some embodiments, the shutoff valve stops fresh air from entering the container. The shutoff valve may be a ball valve, a non-return valve or a stop valve. In other words, the shutoff valve that is described here conveys the released electrolyte, in particular in gaseous form, to the outside and therefore in particular prevents an excessively high overpressure within the container. At the same time, it prevents oxygen from flowing in the form of fresh air, which together with the released electrolyte and ignition energy poses a risk of explosion within the container.

According to some embodiments, the released electrolyte can be attributed to thermal runaway of at least one of the lithium batteries and pressure building up in the container can be discharged to the outside by the shutoff valve. "Thermal runaway" means a chemical exothermic reaction within the cell, as a result of which the cell heats up significantly and in particular ignites the electrolyte that is thus being released. Using the transport device that is described here, the electrolyte that is released by thermal runaway can advantageously be efficiently neutralized or removed from the hold or the aircraft.

According to some embodiments, the released electrolyte is in gaseous or liquid form in the container. Using the transport device that is described here, the electrolyte that is released by thermal runaway and is in gaseous or liquid form can advantageously be efficiently neutralized or removed from the hold or the aircraft, as a result of which pressure is simultaneously prevented from building up within the container.

According to some embodiments, the container and the lid comprise a fire-resistant material. Advantageously, the container and the lid are resistant to very high temperatures.

According to some embodiments, the container comprises separators, the separators dividing an interior of the container into at least two compartments. Advantageously, the separators can prevent a fire from spreading to the adjacent lithium batteries.

According to some embodiments, the separators comprise a thermally and chemically resistant material. For example, the separators may comprise silicon dioxide. Advantageously, the at least two compartments can be insulated from one another using thermally and chemically resistant material.

According to some embodiments, the shutoff valve comprises a pressure sensor and the pressure sensor measures the pressure building up within the container. Advantageously, the pressure sensor can increase the operational safety of the transport device. As a result, the shutoff valve can in particular open efficiently when a predefined pressure within the container is exceeded. Furthermore, the shutoff valve may have a monitoring function, which again increases operational safety. Using the monitoring function, a message can be sent to the cockpit if necessary, so that the crew of the aircraft can implement the necessary measures.

According to some embodiments, the shutoff valve is arranged on a side face of the container. For example, the shutoff valve is positioned on an upper edge of the container. As a result, maintenance can be carried out on the shutoff valve more easily.

BRIEF DESCRIPTION OF THE DRAWINGS

Further features and advantages of the present disclosure are explained in the following on the basis of embodiments and with reference to the drawings, in which.

DETAILED DESCRIPTION

Figure 1:
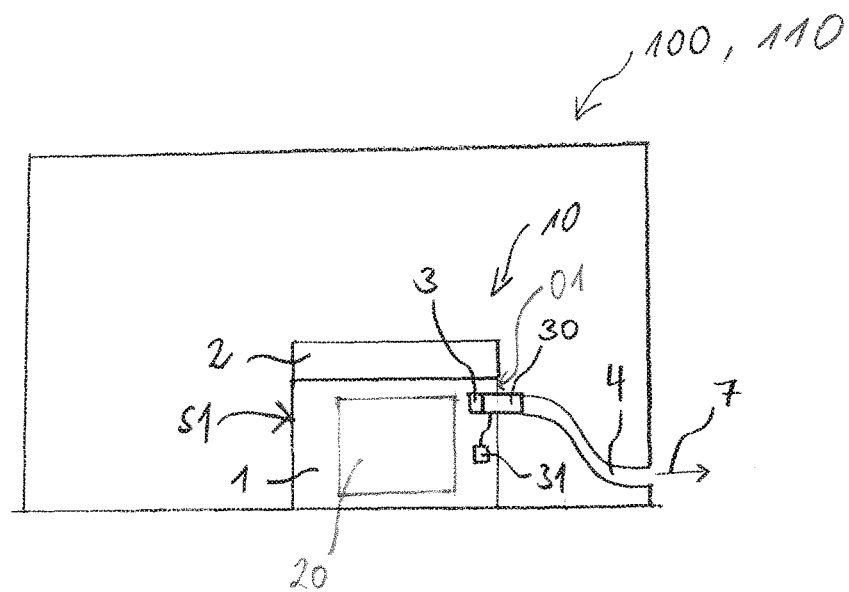
FIG. 1 is a schematic view of a hold of an aircraft comprising a transport device according to an embodiment of the present disclosure.

In the drawings, like reference numerals denote like or functionally like components.

FIG. 1 is a schematic view of a hold 110 of an aircraft 100 comprising a transport device according to an embodiment of the present disclosure.

In FIG. 1, reference numeral 100 denotes the aircraft or the hold 110 of the aircraft 100. The transport device 10 for lithium batteries 20 may be arranged in the aircraft 100 or the hold 110. The transport device 10 may be functional and transportable in itself. The transport device 10 for lithium batteries 20 comprises a container 1 and a lid 2, wherein a plurality of the lithium batteries 20 are arranged in the container 1 and the lid 2 closes the container 1 during transport of the lithium batteries 20. For example, the lid 2 hermetically closes the container 1, the lid 2 and the container 1 being made of a fire-resistant material.

As shown in FIG. 1, the transport device 10 for the lithium batteries 20 comprises a shutoff valve 30, the shutoff valve 30 conveying electrolyte 7 released by the lithium batteries 20 to the outside for example if a pressure building up within the container 1 exceeds a predefined pressure, a catalyst 3 being arranged upstream of the shutoff valve 30 or the shutoff valve 30 being connected to a line 4. The catalyst 3 that is arranged upstream can in particular chemically decompose or neutralize the released electrolyte 7. As a result, the released electrolyte 7 passing the catalyst 3 loses its in particular highly flammable property. Alternatively, the electrolyte 7 released in gaseous form in the event of an external fire or thermal runaway can be conducted to the outside, i.e. to the outside of the aircraft 100, by the line 4 that is connected to the shutoff valve 30. Furthermore, the shutoff valve 30 comprises a pressure sensor 31, the pressure sensor 31 measuring the pressure building up within the container 1. Advantageously, the operational safety of the transport device 10 can be increased by the pressure sensor 31. The shutoff valve 30 is arranged on a side face S1 of the container 1. As shown in FIG. 1, the shutoff valve 30 is arranged on an upper edge O1 of the container 1.

Figure 2:
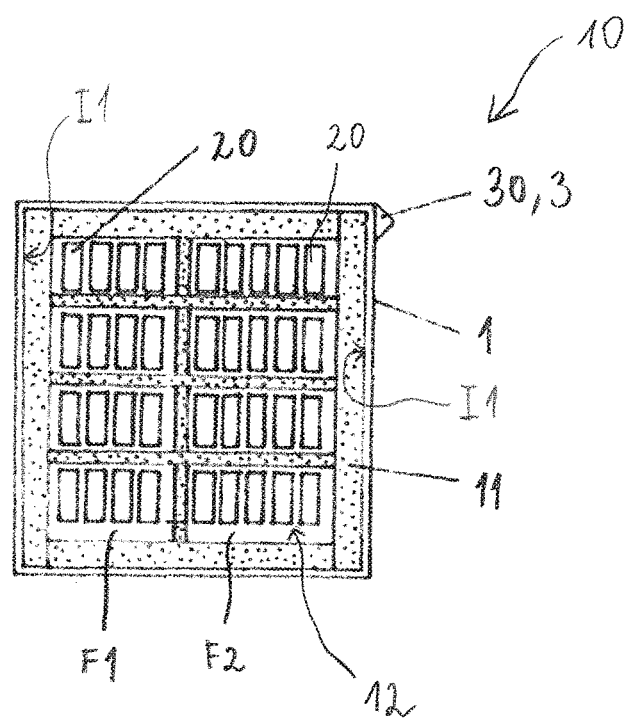
FIG. 2 is a schematic plan view of a transport device that is intended to explain the transport device according to an embodiment of the present disclosure.

FIG. 2 is a schematic plan view of a transport device 10 according to the disclosure herein.

The transport device 10 in particular comprises the container 1, the container 1 comprising a fire-resistant material. An interior 12 of the container 1 may comprise separators 11, it being possible for the separators 11 to be arranged on an inner wall surface 11 of the container 1, in particular in the form of thermal insulation, in order to protect the lithium batteries 20 from excessively rapidly heating up in the event of an external fire, for example. The separators 11 also divide the interior 12 of the container 1 into eight substantially equally sized compartments (shown by way of example by the compartments F1, F2), for example four or five lithium batteries 20 being arranged in the individual compartments F1, F2. The separators 11 comprise a thermally and chemically resistant material. Therefore, in particular in the event of thermal runaway of at least one of the lithium batteries 20 in the compartment F1 or compartment F2, the fire can advantageously be prevented from spreading to an adjacent compartment.

Although the present disclosure has been described on the basis of preferred embodiments, it is not limited to these embodiments. In particular, the stated materials and geometries are only given by way of example and are not limited to the outlined examples.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:
1. A transport device for lithium batteries in an aircraft comprising:
a container;
lithium batteries arranged in the container;

a lid closing the container during transport of the lithium batteries; and a shutoff valve configured to neutralize electrolyte released by the lithium batteries within the container, or configured to convey the electrolyte outside, wherein the container comprises separators which comprise a thermally and chemically resistant material.

2. The transport device of claim 1, wherein the released electrolyte is neutralized by a catalyst arranged upstream of the shutoff valve.

3. The transport device of claim 1, wherein the released electrolyte is conveyed to the outside by a line connected to the shutoff valve.

4. The transport device of claim 1, wherein the shutoff valve is configured to stop fresh air from entering the container.

5. The transport device of claim 1, wherein the released electrolyte can be attributed to thermal runaway of at least one of the lithium batteries and pressure building up in the container can be discharged to the outside by the shutoff valve.

6. The transport device of claim 1, wherein the container and the lid comprise a fire-resistant material.

7. The transport device of claim 1, wherein the separators divide an interior of the container into at least two compartments.

8. The transport device of claim 1, wherein the shutoff valve comprises a pressure sensor configured to measure pressure building up within the container.

9. The transport device of claim 1, wherein the shutoff valve is arranged on a side face of the container.

10. A hold of an aircraft, comprising a transport device for lithium batteries, the transport device comprising:

a container;

lithium batteries arranged in the container;

a lid closing the container during transport of the lithium batteries; and a shutoff valve configured to neutralize electrolyte released by the lithium batteries within the container, or configured to convey the electrolyte outside, wherein the container comprises separators which comprise a thermally and chemically resistant material.

11. The transport device of claim 1, wherein the separators comprise silicon dioxide.

* * * * *